United States Patent
Guo

(10) Patent No.: US 9,973,359 B2
(45) Date of Patent: *May 15, 2018

(54) COGNITIVE RADIO SYSTEM, RESOURCE ALLOCATION APPARATUS THEREOF AND METHOD THEREFOR

(71) Applicant: SONY CORPORATION, Tokyo (JP)

(72) Inventor: Xin Guo, Beijing (CN)

(73) Assignee: Sony Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/235,936

(22) Filed: Aug. 12, 2016

(65) Prior Publication Data

US 2016/0352547 A1 Dec. 1, 2016

Related U.S. Application Data

(62) Division of application No. 14/398,635, filed as application No. PCT/CN2013/074562 on Apr. 23, 2013, now Pat. No. 9,444,663.

(30) Foreign Application Priority Data

May 28, 2012 (CN) .......................... 2012 1 0169698

(51) Int. Cl.
*H04L 27/00* (2006.01)
*H04W 72/02* (2009.01)
(Continued)

(52) U.S. Cl.
CPC ......... *H04L 27/0006* (2013.01); *H04W 16/14* (2013.01); *H04W 52/0216* (2013.01);
(Continued)

(58) Field of Classification Search
CPC .. H04L 27/0006; H04W 16/14; H04W 72/02; H04W 72/04; H04W 52/0216
See application file for complete search history.

(56) References Cited

U.S. PATENT DOCUMENTS 8,160,163 B1 * 4/2012 Yucek ................ H04L 27/0006
375/246
2005/0054359 A1 3/2005 Ishii
(Continued)

FOREIGN PATENT DOCUMENTS

CN 101257714 A 9/2008
CN 101404513 A 4/2009
(Continued)

OTHER PUBLICATIONS

International Search Report dated Jul. 25, 2013 in PCT/CN2013/074562 filed Apr. 23, 2013.

*Primary Examiner* — Gary Mui
(74) *Attorney, Agent, or Firm* — Oblon, McClelland, Maier & Neustadt, L.L.P.

(57) ABSTRACT

Disclosed is a cognitive radio system, resource allocation apparatus thereof and method therefor. A resource allocation apparatus comprises: a transmission opportunity assessment device which is used to assess availabilities of transmission opportunities in radio resources of a primary communication system; a vector production device which is used to set a transmission opportunity selection vector for each secondary user in the cognitive radio system based on assessment results of the availabilities of transmission opportunities, wherein the transmission opportunity selection vector includes information for identifying multiple transmission opportunities assessed available; and a sending device which is used to distribute the transmission opportunity selection vector to the secondary user.

19 Claims, 7 Drawing Sheets

(51) Int. Cl.
*H04W 52/02* (2009.01)
*H04W 72/04* (2009.01)
*H04W 16/14* (2009.01)

(52) U.S. Cl.
CPC ....... *H04W 52/0219* (2013.01); *H04W 72/02* (2013.01); *H04W 72/04* (2013.01); *Y02D 70/00* (2018.01)

(56) References Cited

U.S. PATENT DOCUMENTS

| | | | |
|---|---|---|---|
| 2008/0261639 A1 | 10/2008 | Sun | |
| 2009/0197626 A1* | 8/2009 | Huttunen | H04W 72/02 455/522 |
| 2009/0207735 A1* | 8/2009 | Ben Letaief | H04L 5/0032 370/237 |
| 2010/0069013 A1 | 3/2010 | Chaudhri et al. | |
| 2010/0248760 A1 | 9/2010 | Li | |
| 2011/0070838 A1* | 3/2011 | Caulfield | H04W 16/14 455/62 |
| 2012/0129462 A1* | 5/2012 | Pihlaja | H04W 16/14 455/67.11 |
| 2012/0135779 A1 | 5/2012 | Kundargi | |
| 2013/0294356 A1 | 11/2013 | Bala | |

FOREIGN PATENT DOCUMENTS

| | | |
|---|---|---|
| CN | 101909303 A | 12/2010 |
| CN | 102362435 A | 2/2012 |
| JP | 2007-88940 A | 4/2007 |
| JP | 2009-200773 A | 9/2009 |
| JP | 2011-176506 A | 9/2011 |
| WO | WO 2012/057584 A2 | 5/2012 |

\* cited by examiner

COGNITIVE RADIO SYSTEM, RESOURCE ALLOCATION APPARATUS THEREOF AND METHOD THEREFOR

CROSS-REFERENCE TO RELATED APPLICATIONS

This application is a divisional application of U.S. application Ser. No. 14/398,635, filed Nov. 3, 2014, which is the national stage of PCT Application No. PCT/CN2013/074562, filed Apr. 23, 2013, the entire contents of each of which are incorporated herein by reference

FIELD OF THE INVENTION

The present disclosure relates to the filed of cognitive radio, and particularly, to a cognitive radio system as well as a resource allocation apparatus and method and a resource utilization apparatus and method in the cognitive radio system.

BACKGROUND OF THE INVENTION

Limited wireless resources are becoming particularly rare due to increasingly growth of demands for wireless multimedia services from users, and thus promoting communication technology to rapidly develop towards more reasonable and efficient utilization for wireless resources. However, a fixed spectrum allocation strategy employed nowadays disables a licensed spectrum to be sufficiently used by a primary user of a primary communication network (a wireless user which possesses right of use for the licensed spectrum), which becomes bottleneck for utilization of wireless resources. The cognitive radio technology has emerged as the times require under this circumstance. The function of the cognitive radio causes a secondary user of a secondary communication network (a wireless user which does not possess the right of use for the licensed spectrum) to interact with a wireless environment in which it locates, discover more available spectrum resources and dynamically change its operating parameters to enable effective utilization for these resources and to limit influence on the primary user within a limited range.

In the cognitive radio technology, use patterns of the licensed spectrum exhibit complex randomness to the secondary user due to lack of information about spectrum allocation for the primary user, so that it is difficult for the secondary user of the secondary communication system to achieve effective resource utilization for the licensed spectrum.

SUMMARY OF THE INVENTION

Some of embodiments of the disclosure provide a resource allocation apparatus and method, a resource utilization apparatus and method and a cognitive radio system applying the apparatuses and methods, which are capable of rapidly and effectively allocating resources to the secondary user in the cognitive radio system.

The brief summary of the disclosure will be given below to provide basic understanding of some aspects of the disclosure. However, it shall be appreciated that this summary is neither exhaustively descriptive of the invention nor intended to define essential or important components or the scope of the disclosure but is merely for the purpose of presenting some concepts of the disclosure in a simplified form and hereby acts as a preamble of more detailed descriptions which will be presented later.

According to an aspect of the disclosure, there is provided a resource allocation apparatus in a cognitive radio system, the apparatus including: a transmission opportunity evaluating device configured to evaluate availability of transmission opportunities in wireless resources of a primary communication system; a vector generating device configured to set a transmission opportunity selection vector for each secondary user in the cognitive radio system according to a result of the evaluating of the availability of the transmission opportunities, the transmission opportunity selection vector including information for identifying a plurality of transmission opportunities that have been evaluated as available; and a transmitting device configured to transmit the transmission opportunity selection vector to the secondary user.

According to another aspect of the disclosure, there is provided a resource allocation method in a cognitive radio system, the method including: evaluating availability of transmission opportunities in wireless resources of a primary communication system; setting a transmission opportunity selection vector for each secondary user in the cognitive radio system according to a result of the evaluating of the availability of the transmission opportunities, the transmission opportunity selection vector including information for identifying a plurality of transmission opportunities that have been evaluated as available; and transmitting the transmission opportunity selection vector to the secondary user.

According to another aspect of the disclosure, there is provided a resource utilization apparatus in a cognitive radio system, the apparatus including: a receiving device configured to receive a transmission opportunity selection vector for a secondary user, the transmission opportunity selection vector including information for identifying a plurality of transmission opportunities that have been evaluated as available; and a sensing device configured to sense each transmission opportunity that has been evaluated as available in the transmission opportunity selection vector, to judge whether the transmission opportunity is currently available, and if yes, to determine that the transmission opportunity is available for data transmission, otherwise, to sequentially sense a next transmission opportunity in the transmission opportunity selection vector, until an available transmission opportunity is found or until there is no selectable transmission opportunity that has been evaluated as available in the transmission opportunity selection vector.

According to another aspect of the disclosure, there is provided a resource utilization method in a cognitive radio system, the method including: receiving a transmission opportunity selection vector for a secondary user, the transmission opportunity selection vector including information for identifying a plurality of transmission opportunities that have been evaluated as available; and sensing each of the transmission opportunities that have been evaluated as available included in the transmission opportunity selection vector, to judge whether the transmission opportunity is currently available; and if yes, determining that the transmission opportunity is available for data transmission, otherwise, sequentially sensing a next transmission opportunity in the transmission opportunity selection vector, until an available transmission opportunity is found or until there is no selectable transmission opportunity that has been evaluated as available in the transmission opportunity selection vector.

According to another aspect of the disclosure, there is further provided a cognitive radio system including the resource allocation apparatus and the resource utilization apparatus described above.

According to another aspect of the disclosure, there is further provided a resource allocation and utilization method in a cognitive radio system, including the resource allocation method and the resource utilization method described above.

Further, the present disclosure further provides a computer program to realize the methods described above.

Further, the disclosure also provides a computer program product in at least a computer-readable medium format on which computer program codes to realize the methods described above are recorded.

BRIEF DESCRIPTION OF THE DRAWINGS

The above and other objects, features and advantages of the disclosure can be more easily understood by referring to description of embodiments of the disclosure given below in conjunction with the accompanying drawings. Components in the drawings are not drawn to scales but merely for illustrating principles of the disclosure. In the drawings, identical or similar technical features or components are denoted by identical or similar reference numbers.

DETAILED DESCRIPTION OF THE INVENTION

Figure 1:
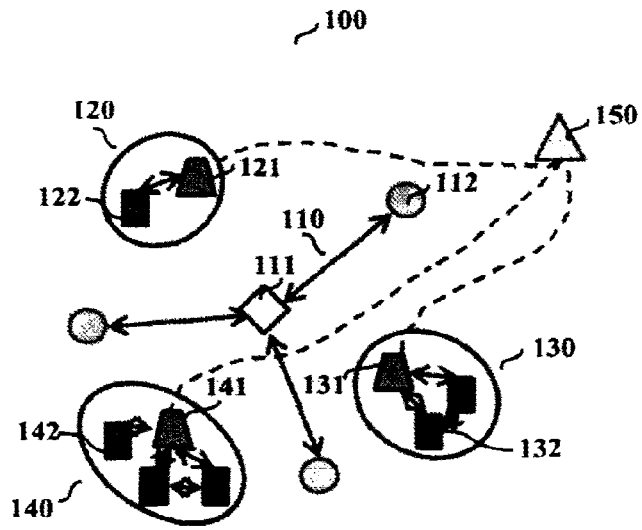
FIG. 1 is a schematic diagram illustrating an example of a cognitive radio communication work.

Embodiments of the disclosure will be described below in conjunction with the accompanying drawings. Elements and features described in one drawing or one embodiment of the disclosure may be combined with elements and features shown in one or more other drawings or embodiments. It should be noted that for the sake of clarity, the representation and description about components and processing less relevant to the disclosure which are known to those ordinarily in this art are omitted in the drawings and the description.

Some of the embodiments of the disclosure provide a resource allocation apparatus and method, a resource utilization apparatus and method and a cognitive radio system using the apparatuses and methods, which are capable of rapidly and effectively allocating resources to the secondary user in the cognitive radio system.

In order to better understand the embodiments of the disclosure, an application scene in which the embodiments of the disclosure may be applied will be briefly described below. FIG. 1 is a schematic diagram illustrating an example of a cognitive radio communication network.

As shown in FIG. 1, a cognitive radio network 100 includes a primary network 110, and further includes one or more secondary networks, like secondary networks 120, 130 and 140 as shown in FIG. 1. The primary network 110 includes a primary user (PU) 112 (a circle as shown in FIG. 1) and a primary base station (PBS) 111 (a diamond block as shown in FIG. 1). Each secondary network contains a secondary user (SU) (a rectangular block 122, 132, 142 as shown in FIG. 1) and a secondary base station (SBS) (a trapezoid block 121, 131, 141 as shown in FIG. 1).

The primary user is authorized to use the licensed spectrum under coordination of the primary base station. Transmission of each node (the primary user and the primary base station) of the primary network is not allowed to be subjected to interference from a signal of each node (the secondary user and the secondary base station) of the secondary network, or the subjected interference should be necessarily within a tolerable range. The primary network nodes have no cognitive radio function, and thus it should ensure the primary network nodes can operate normally without knowing presence of the secondary network.

The secondary network uses the licensed spectrum of the primary network only when influence on the primary network nodes from the signal of the secondary network nodes is within a limited range. Use of spectrums by the secondary user may be generally managed by the secondary base station. The secondary network nodes have the cognitive radio function, which mainly includes spectrum sensing and analysis, spectrum management and switch, spectrum allocation and share and the like.

The cognitive radio network may include one or more secondary networks. In a case where a plurality of secondary networks share a spectrum, a spectrum coordinator (SC) is generally used to manage. For example, in the example of the cognitive radio network as shown in FIG. 1, a spectrum coordinator 150 (a triangle as shown in FIG. 1) for performing spectrum resource coordination among the secondary networks is included. The spectrum coordinator collects operating information of each secondary network and performs resource allocation, thereby realizing efficient and fair resource share among the secondary networks. To enable the secondary networks to improve convenience of distribution and flexibility, there is no direct information interaction between the primary network and the secondary networks. The secondary network nodes adjust used resources and relevant system configuration by sensing, detecting and monitoring the licensed spectrum so as to realize share for the resources without affecting the primary network nodes.

In the resource allocation method and apparatus in the cognitive radio system according to some of the embodiments of the disclosure, availability of each wireless resource evaluated by the secondary user in the future (whether it is possible to successfully perform data transmission using the wireless resource) is predicted according to history information of use condition of the licensed spectrum sensed by the secondary network, the secondary user is guided to select resources, thereby realizing effective allocation of the resources.

In the embodiments according to the disclosure, evaluation for availability of the wireless resources by the secondary user is involved. The wireless resources are divided in a unit of transmission opportunity (TO). The transmission opportunity referred herein means a subset of primary system resources, which may include one or more allocation units of the primary system resources. For example, in a FDMA network, one transmission opportunity may correspond to one frequency band or a set of frequency bands; in a TDMA network, one transmission opportunity corresponds to one time slot or a set of time slots; while in an OFDM network, one transmission opportunity corresponds to one resource block or a set of resource blocks (RBs).

Figure 2:
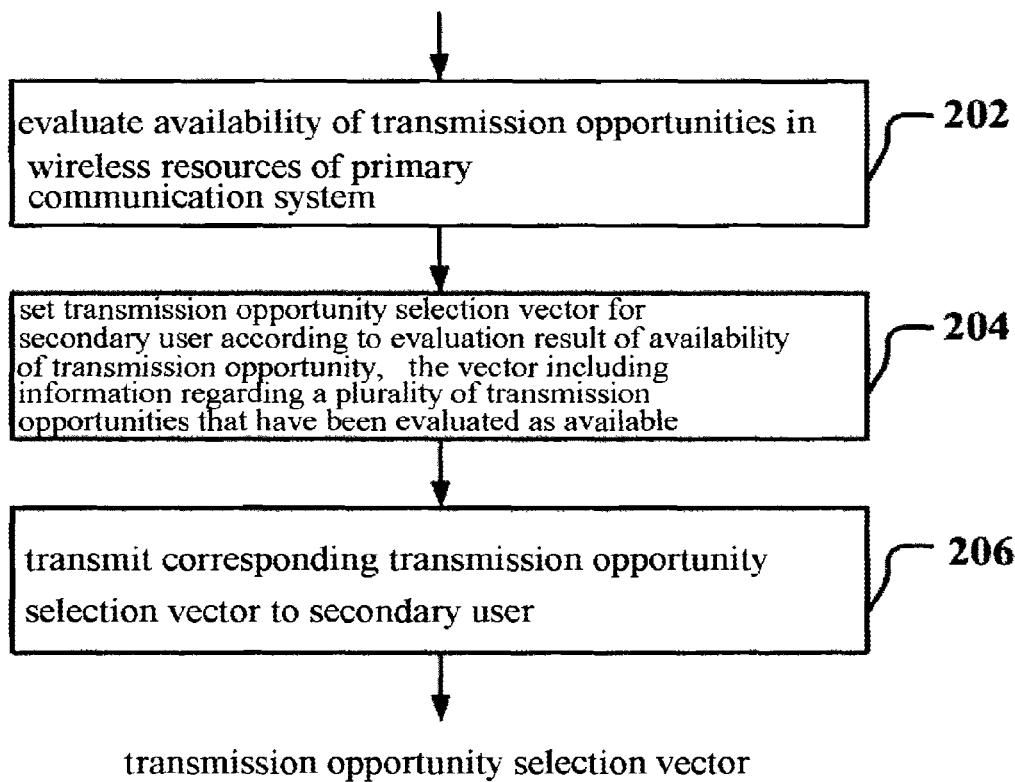
FIG. 2 is a schematic flow chart illustrating a resource allocation method in a cognitive radio system according to an embodiment of the disclosure.

FIG. 2 is a flow chart illustrating a resource allocation method according to an embodiment of the disclosure. The resource allocation method may be implemented by the secondary base station of the secondary network, or may be implemented by the spectrum coordinator in a case of a plurality of secondary networks.

As shown in FIG. 2, the resource allocation method includes steps 202, 204 and 206.

Specifically, in step 202, availability of transmission opportunities in wireless resources of a primary communication system is evaluated.

The availability of a transmission opportunity referred herein is a feature value for representing whether the transmission opportunity is available to the secondary user. It may be used to characterize use patterns for the licensed spectrum by the primary network and the secondary networks.

As an example, the availability of the transmission opportunity may be represented by one or more of a contiguous idle time duration (CITD) statistic, a transmission result estimator and transmission opportunity selection probability. The contiguous idle time duration statistic indicates a contiguous time length during which a frequency band corresponding to the transmission opportunity is not used by the primary network, the transmission result estimator indicates a statistical result that the secondary user successfully realizes data transmission on the frequency band corresponding to each transmission opportunity, and the transmission opportunity selection probability indicates a probability that the secondary user selects the transmission opportunity and succeeds in transmission.

As one example, the contiguous idle time duration statistic of the transmission opportunity may be calculated as the feature value reflecting the availability of the transmission opportunity. The contiguous idle time duration statistic of the transmission opportunity may be represented by one or more of the following parameters: (1) an average time length of contiguous idle time durations of the frequency band in which the transmission opportunity is located in a past predetermined time period; (2) a time length of a contiguous idle time duration having a maximum occurrence probability of a frequency band in which the transmission opportunity is located within a past predetermined time period; (3) a time length of a contiguous idle time duration in which a corresponding time point is located of a frequency band in which a current transmission opportunity is located within a past predetermined time period (if the current transmission opportunity is used by the primary network, the value is zero). These time statistic may be sensed by the spectrum coordinator or the secondary base station, or may be sensed by each secondary user and reported to the secondary base station or the spectrum coordinator to perform statistics; and (4) number of accumulated contiguous idle time durations of a frequency band in which the transmission opportunity is located within a past predetermined time period.

As one example, the transmission result estimator of the transmission opportunity may be further calculated as the feature value reflecting the availability of the transmission opportunity. The transmission result estimator may be defined as number of times that the secondary user successfully performs data transmission on a frequency band corresponding to each transmission opportunity within a predetermined time period prior to a time point corresponding to the current transmission opportunity. As a modification, the transmission result estimator may be normalized as a ratio of the number of times that the secondary user successfully performs data transmission on the frequency band corresponding to each transmission opportunity to a total number of times that the secondary user attempts to perform data transmission within the predetermined time period prior to the time point corresponding to the current transmission opportunity. Information regarding whether the data transmission on the transmission opportunity performed by the secondary user is successful is fed back to the secondary base station or the spectrum coordinator by the secondary user and is statistically calculated by the secondary base station or the spectrum coordinator.

As one example, the transmission opportunity selection probability may be further calculated according to the transmission result estimator described above. The transmission opportunity selection probability varies with a variation in the transmission result estimator. Specifically, the transmission opportunity selection probability increases as the transmission result estimator increases, and decreases as the transmission result estimator decreases. The transmission opportunity selection probability may be calculated by using a method described with reference to formulas (15), (28) or (29) below for example, and no detailed description will be made herein.

Figure 3:
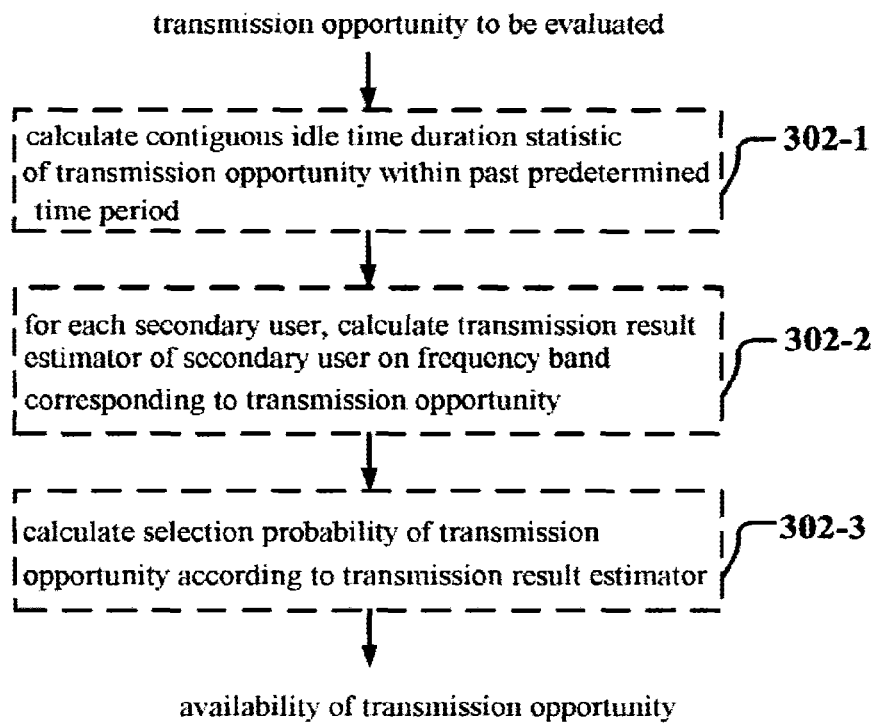
FIG. 3 is a schematic flow chart illustrating an example of a method of evaluating availability of a transmission opportunity.

FIG. 3 is a schematic flow chart illustrating a specific example of evaluating the availability of the transmission opportunity. As shown in FIG. 3, the method may include step 302-1 in which the contiguous idle time duration statistic of the transmission opportunity within the past predetermined time period is calculated. Alternatively, the method may further include steps 302-2 and 302-3. In step 302-2, for each secondary user, the transmission result estimator on a frequency band corresponding to a transmission opportunity to be evaluated of the secondary user is calculated. Specifically, as the transmission result estimator of the transmission opportunity, the number of times that the secondary user successfully performs data transmission on the frequency band corresponding to the transmission opportunity within a predetermined time period prior to a current time point may be calculated, or a ratio of the number of times that the data transmission is successful to a total number of times that the secondary user attempts to perform data transmission on the frequency band corresponding to the transmission opportunity may be calculated. In step 302-3, the selection probability of the transmission opportunity is calculated according to the transmission result estimator. As another example of the method of evaluating the availability of the transmission opportunity, for each secondary user, the transmission result estimator on the frequency band corresponding to the transmission opportunity to be evaluated of the secondary user may be calculated as a basis for evaluating the availability of the transmission opportunity. In other words, in this example, the method of evaluating the availability of the transmission opportunity may only include step 302-2, without including step 302-1 of evaluating the contiguous idle time duration statistic.

As a specific example, the spectrum coordinator or the secondary base station may save information about the availability of the transmission opportunity of each secondary user, and calculate and update the information about the availability of the transmission opportunity of each secondary user according to a transmission result fed back by the secondary user and a detection result of a transmission opportunity not selected by the secondary user from the secondary base station during the resource allocation.

Then, in the step 204, a transmission opportunity selection vector is set for each secondary user in the cognitive radio system according to the availability of each transmission opportunity, the transmission opportunity selection vector of each secondary user including information for identifying a plurality of transmission opportunities that have been evaluated as available (that is, the transmission opportunities which have been evaluated as available in step 204).

The spectrum coordinator or the secondary base station sets a transmission opportunity selection vector for each secondary user. Information identifying each of the transmission opportunities may be included in the vector. The information identifying the transmission opportunity referred herein may be a sequence number or other identifier of the transmission opportunity. As one example, the transmission opportunity selection vector may be a certain permutation of the sequence numbers of (all or part of) the transmission opportunities.

For example, when setting the transmission opportunity selection vector for each secondary user, it is necessary to ensure the sequence numbers of the transmission opportunities at the same position of the transmission opportunity selection vectors of respective secondary users are different. As such, it is possible to avoid collision among the secondary users (that is, different secondary users occupy the same transmission opportunity at the same time) at the time of transmission opportunity selection. Further, for example, when setting the transmission opportunity selection vector for each secondary user, it is necessary to ensure the sequence numbers of the transmission opportunities at different positions of the transmission opportunity selection vector of a same secondary user are different. As such, it is possible to avoid the secondary user from repeatedly selecting the same transmission opportunity for many times at transmission opportunity selection phases in one transmission opportunity.

A length of the transmission opportunity selection vector is number of elements (that is, the sequence numbers of the transmission opportunities) in the vector. As one example, the length of the transmission opportunity selection vector may be set in consideration of one or more of the following factors: first, a method for the transmission opportunity selection and time limit thereof, that is, an upper limit of total time used for selecting the transmission opportunity by the secondary user should not exceed the time length of one transmission opportunity; second, the vector should have a certain length, that is, it needs to ensure that the secondary user may have sufficient selection opportunities so as to improve a resource utilization rate; and third, amount of information should be considered, that is, bandwidth occupied when transmitting the information to the secondary user and incurred delay of time should be reduced as much as possible. The length of each transmission opportunity selection vector may be selected according to actual application conditions, and no specific numerical value will be defined herein.

As one example, for example, in a case that the availability of the transmission opportunity is measured by calculating the transmission opportunity selection probability and/or the contiguous idle time duration statistic using the method as shown in FIG. 3, the spectrum coordinator or the secondary base station may set the transmission opportunity selection vector for each secondary user according to the transmission opportunity selection probability and/or the contiguous idle time duration statistic. In one specific example, the transmission opportunity selection probability may be set by using the transmission opportunity selection probability as the feature value measuring the availability of the transmission opportunity. The lager the value of the transmission opportunity selection probability is, the higher the probability that the secondary user may succeed in data transmission by selecting the transmission opportunity. In another specific example, the transmission opportunity selection vector may be set by using the contiguous idle time duration statistic as the feature value measuring the availability of the transmission opportunity. Three time parameters representing the contiguous idle time duration statistic described above may function differently in the calculation of the transmission opportunity selection vector, for example, when two transmission opportunities have the same transmission opportunity selection probability value, it is preferable that a transmission opportunity for which the difference between the average time length of the contiguous idle time duration and a time length of the contiguous idle time duration in which a time point corresponding to the current transmission opportunity is located is larger, this is because the probability that a frequency band corresponding to the transmission opportunity is idle on next transmission opportunity is higher.

After obtaining the transmission opportunity selection vector for the secondary user through calculation, in step 206, the spectrum coordinator or the secondary base station transmits the generated transmission opportunity selection vector to the corresponding secondary user.

In the embodiments and examples described above, a transmission opportunity selection vector is set for each secondary user, that is, a rule for selecting the transmission opportunity by the secondary user is set, and since a plurality of transmission opportunities provided to a secondary user are selected according to the availability of the transmission opportunities with respect to the secondary user, the efficiency for selecting the transmission resource by the secondary user is improved and the resource utilization rate is improved.

Moreover, as described above, as an example, the transmission opportunity selection vector may include only the sequence numbers of the transmission opportunities that have been evaluated as available with respect to the secondary user, and thus the transmission of the transmission opportunity selection vector only occupies less transmission resources and incurs less delay of time.

As one example, the information for identifying the plurality of transmission opportunities that have been evaluated as available in the transmission opportunity selection vector may be arranged in an order based on availability values of the plurality of transmission opportunities that have been evaluated as available. In this way, the secondary user preferably selects a transmission opportunity with a larger availability value according to a rank of each transmission opportunity in the vector, thereby further reducing the time taken for selection, and the resource selection efficiency may be further improved.

As another example, components (that is, identification information of the transmission opportunities that have been evaluated as available) at the same corresponding positions of the transmission opportunities selection vectors selected for different secondary users are different from each other, and thus it is possible to avoid transmission collision among the secondary users.

The method for allocating the transmission resources to the secondary users by the spectrum coordinator or the secondary base station according to the embodiments or examples of the disclosure has been described above. Some of embodiments and examples of a method for selecting the transmission opportunity according to the received transmission opportunity selection vector on the secondary user side according to the disclosure will be described below.

Figure 4:
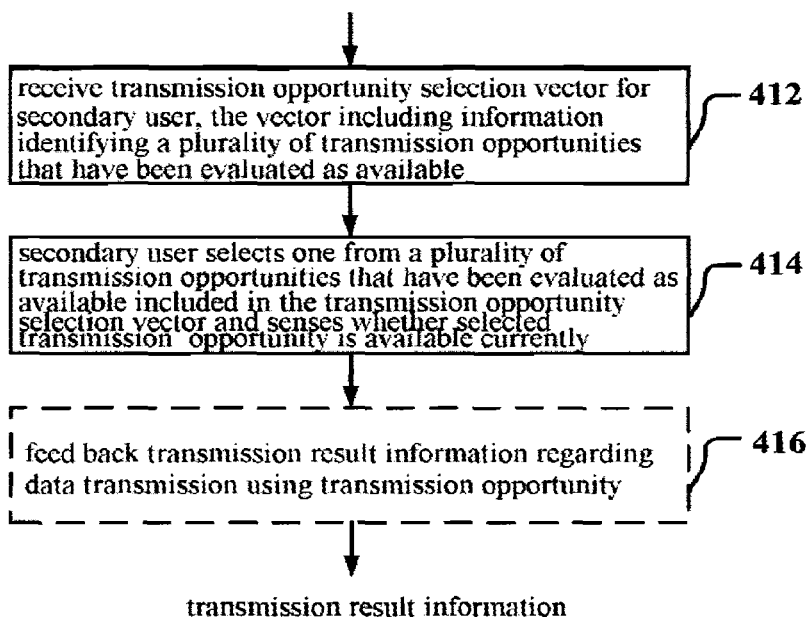
FIG. 4 is a schematic flow chart illustrating a resource utilization method in a cognitive radio system according to an embodiment of the disclosure.

FIG. 4 is a schematic flow chart illustrating a resource utilization method in a cognitive radio system according to an embodiment of the disclosure. The resource utilization method is implemented on the secondary user side.

As shown in FIG. 4, the method includes steps 412 and 414.

In step 412, a secondary user receives the transmission opportunity selection vector used for the secondary user from the spectrum coordinator or the secondary base station. The transmission opportunity selection vector includes a plurality of transmission opportunity components, each transmission opportunity component corresponding to identification information of a candidate transmission opportunity (that is, a transmission opportunity that has been evaluated as available by the spectrum coordinator or the secondary base station, which is also referred as a transmission opportunity that has been evaluated as available).

As one example, the transmission opportunity selection vector may be a permutation of the sequence numbers of the plurality of transmission opportunities that have been evaluated as available, such as the permutation in an order based on the availability values of the transmission opportunities. Detailed description and specific examples of the transmission opportunity selection vector have been given in the embodiments or examples described above, and no repeated description will be made herein.

Then, in step 414, the secondary user selects a transmission opportunity from the plurality of transmission opportunities that have been evaluated as available included in the transmission opportunity selection vector, and senses the selected transmission opportunity to judge whether the transmission opportunity is currently available (that is, senses whether the transmission opportunity is currently used by the primary network). If yes (that is, if it is sensed that the transmission opportunity is idle currently), the transmission opportunity is used to perform data transmission. Otherwise, a next transmission opportunity that has been evaluated as available in the transmission opportunity selection vector is sensed. If it is sensed that all the transmission opportunities that have been evaluated as available in the transmission opportunity selection vector are unavailable currently, the secondary user does not perform data transmission this time.

In one specific example, the information for identifying the plurality of transmission opportunities that have been evaluated as available in the transmission opportunity selection vector may be arranged in an order based on availability values of the plurality of transmission opportunities that have been evaluated as available. Thus, in step 414, the secondary user may first sense a transmission opportunity that has been evaluated as available corresponding to a largest availability value among the plurality of transmission opportunities that have been evaluated as available in the transmission opportunity selection vector, and if it is sensed that the transmission opportunity is available, then the available transmission opportunity is used to perform data transmission. Otherwise, the secondary user sequentially senses a next transmission opportunity that has been evaluated as available in the transmission opportunity selection vector.

Assume that time taken for accomplishing the selection and sensing operation once for the transmission opportunity that has been evaluated as available in the transmission opportunity selection vector by the secondary user is referred as a transmission opportunity selection unit (SeU). One selection and sensing operation includes an operation of sensing a frequency band corresponding to a certain transmission opportunity and detecting whether the frequency band has been occupied. The number of the transmission opportunity selection units used by the secondary user equals to the length of the transmission opportunity selection vector. At a start time point of each transmission opportunity selection unit, the secondary user senses a transmission opportunity corresponding to an element at a corresponding position in the transmission opportunity selection vector, and if a detection result indicates that the transmission opportunity is available, the secondary user immediately turns to the data transmission phase, and if the detection result indicates that the transmission opportunity is unavailable, the secondary user senses and detects a transmission opportunity corresponding to a next element in the transmission opportunity selection vector at the start of a next transmission opportunity selection unit. Repeat this until an available transmission opportunity is found so as to turn to the data transmission phase, or stop the transmission opportunity selection if no available transmission opportunity has been found after attempting on all the transmission opportunities that have been evaluated as available in the transmission opportunity selection vector.

As one example, the resource utilization method as shown in FIG. 4 may further include step 416. In step 416, the secondary user feeds back transmission result information regarding data transmission by using the transmission opportunity.

As a specific example, the transmission result information fed back by the secondary user includes a transmission result vector and/or a transmission result value. The transmission result vector includes information indicating whether each of transmission opportunities in the transmission opportunity selection vector is available to the secondary user and/or whether data transmission is successful. The transmission result value indicates a position of a transmission opportunity used by each secondary user in the transmission opportunity selection vector, if the value is smaller than the length of the transmission opportunity selection vector, the selected transmission opportunity can be determined by inquiring the transmission opportunity selection vector; and if the value is not smaller than the length of the transmission opportunity selection vector, it can be determined that the secondary user finds no available transmission opportunity.

As a specific example, a timing at which the secondary user feeds back the information can be determined according to a feedback channel. For example, a dedicated feedback channel may be used to perform feedback immediately after the secondary user determines the transmission opportunity. Further, for example, for a secondary user having obtained an available transmission opportunity, the obtained resources may be used to perform feedback after the data transmission, while a secondary user having not obtained an available transmission opportunity uses some dedicated feedback channels to perform feedback after completing the transmission opportunity selection.

If the secondary base station receives information regarding transmission opportunities which may not be selected by the secondary user from the spectrum coordinator, the secondary base station senses these transmission opportunities to detect whether they have been used by the primary system at the transmission opportunity selection stage.

Some application examples of the resource allocation and utilization methods according to the disclosure will be described with reference to FIGS. 5-8 below.

In these examples, assume that a system of a cognitive radio network includes: one spectrum coordinator, written as SC; $N_{SBS}$ secondary base stations, written as $SBS_0$, $SBS_1, \ldots, SBS_{N_{SBS}-1}$ respectively; Nsu secondary users, written as $SU_0, SU_1, \ldots, SU_{N_{SU}-1}$ respectively.

Figure 5:
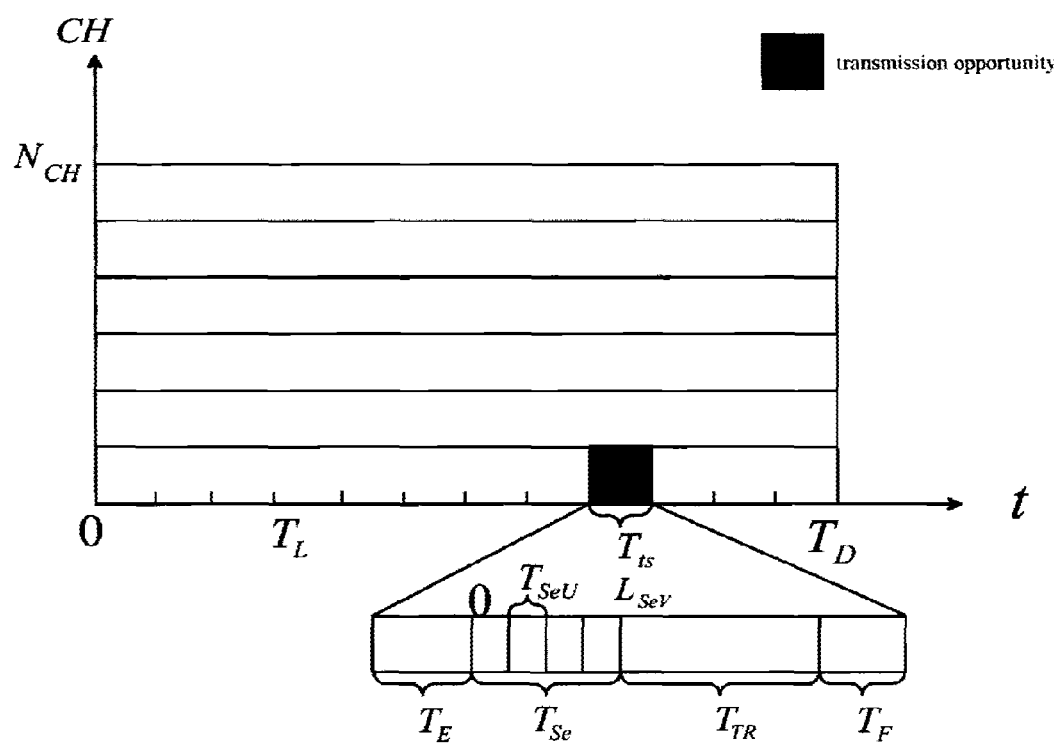
FIG. 5 is a schematic diagram illustrating an example of resource division in a cognitive radio network.

FIG. 5 illustrates one example of resource division of the cognitive radio network. Assume that resources of the cognitive radio network are divided according to the example as shown in FIG. 5: the primary network includes $N_{CH}$ channels, written as $CH_0, CH_1, \ldots, CH_{N_{CH}-1}$ respectively; a time length of one time slot is written as $T_{ts}$, a time axis is divided by time slots, and a time variable is written as $t \in [0, \infty]$; and one transmission opportunity includes one time slot of one channel. Therefore, at the t-th time slot, the transmission opportunity is identified by a channel sequence number (hereinafter, the channel sequence number and the transmission opportunity sequence number are the same).

In this example, evaluation for the availability of the transmission opportunity, calculation of the transmission opportunity selection vector and transmission of transmission opportunity selection vector are performed by the spectrum coordinator. The spectrum coordinator performs the above processing when each transmission opportunity starts, and the total used time is written as $T_E$.

Time used by the secondary user to select the transmission opportunity according to the transmission opportunity selection vector is written as $T_{Se}$, wherein the length of the transmission opportunity selection vector is written as $L_{SeV}$, and time a length for selecting one transmission opportunity is written as $T_{SeU}$. Time used for data transmission is written as $T_{TR}$, characterizing a minimum active time that may be used to perform data transmission by the secondary user.

Time used by the secondary user to feed back the transmission result is written as $T_F$.

The above time setting is only an example. In practical applications, it needs to consider a specific secondary network transmission protocol and an optimization target of transmission performance for the secondary user, without being limited to the above example.

Further, assume that a channel $CH_j$ ($j \in [0, \ldots N_{CH}-1]$) has three parameters related to the contiguous idle time duration statistic: (1) $\overline{CITD}_j(t)$, defined as an average time length of contiguous idle time durations on the channel $CH_j$ before a time slot t; (2) $CITD_j(t)$, defined as a time length of a contiguous idle time duration on the channel $CH_j$ at a time slot t−1, if the channel $CH_j$ has been used by the primary network at the time slot t−1, the value is 0; and (3) $\widehat{CITD}_j(t)$, defined as number of accumulated contiguous idle time durations on the channel $CH_j$ before the time slot t.

The transmission result estimator for the channel $CH_j$ ($j \in [0, \ldots N_{CH}-1]$) by the secondary user $SU_i$ ($i \in [0, \ldots N_{SU}-1]$) before the time slot $t \in [0, \infty]$ may be represented by $d_{i,j}(t)$. Assume that the number of times that the secondary user $SU_i$ selects the channel $CH_j$ before the time slot t is $z_{i,j}(t)$, in which the number of times that the data transmission is successful by using the channel $CH_j$ is $W_{i,j}(t)$. If $z_{i,j}(t) \neq 0$, the transmission result estimator $d_{i,j}(t)$ may be calculated by using the following formula:

$$d_{i,j}(t) = \frac{W_{i,j}(t)}{z_{i,j}(t)} \tag{1}$$

The transmission result estimators for all the channels of the secondary user $SU_i$ before the time slot t can be constituted as a vector which is represented as $D_i(t)=[d_{i,0}(t), \ldots, d_{i,N_{CH}-1}(t)]$. The transmission result estimators of all the secondary users before the time slot t can be constituted as a matrix $D(t)$ which can be represented using the following formula:

$$D(t) = \begin{bmatrix} d_{0,0}(t) & \ldots & d_{0,N_{CH}-1}(t) \\ \ldots & \ldots & \ldots \\ d_{N_{SU}-1,0}(t) & \ldots & d_{N_{SU}-1,N_{CH}-1}(t) \end{bmatrix} \tag{2}$$

The transmission opportunity selection probability for the channel $CH_j$ by the secondary user $SU_i$ at the time slot t can be represented as $p_{i,j}(t)$; the transmission opportunity selection probabilities for all the channels at the time slot t can be constituted as a vector which is represented as $P_i(t)=[p_{i,0}(t) \ldots p_{i,N_{CH}-1}(t)]$, and $\forall i, \Sigma_{0 \leq j \leq N_{CH}-1} p_{i,j}(t)=1$. The transmission opportunity selection probabilities of all the secondary users at the time slot t can be constituted as a matrix $P(t)$ which can be represented by the following formula:

$$P(t) = \begin{bmatrix} p_{0,0}(t) & \ldots & p_{0,N_{CH}-1}(t) \\ \ldots & \ldots & \ldots \\ p_{N_{SU}-1,0}(t) & \ldots & p_{N_{SU}-1,N_{CH}-1}(t) \end{bmatrix} \tag{3}$$

The transmission opportunity selection vector of the secondary user $SU_i$ at the time slot t can be represented as $S_i=[s_{i,0}(t) \ldots s_{i,L_{SeV}-1}(t)]$, in which $s_{i,j}(t) \in [-1 \ldots N_{CH}-1]$, $j \in [0 \ldots L_{SeV}-1]$, in which −1 represents there is no selectable transmission opportunity, and $[0 \ldots N_{CH}-1]$ corresponds to the sequence number of the channel. The transmission opportunity selection vectors of all the secondary users at the time slot t can be constituted as a selection matrix $S(t)$ which can be represented by the following formula:

$$S(t) = \begin{bmatrix} s_{0,0}(t) & \ldots & s_{0,L_{SeV}-1}(t) \\ \ldots & \ldots & \ldots \\ s_{N_{SU}-1,0}(t) & \ldots & s_{N_{SU}-1,L_{SeV}-1}(t) \end{bmatrix} \tag{4}$$

The transmission result vector of the secondary user $SU_i$ at the time slot t can be represented as $R_i(t)=[r_{i,0}(t) \ldots r_{i,L_{SeV}-1}(t)]$, in which $r_{i,j}(t) \in \{0,1\}$ represents whether the transmission opportunity $S_{i,j}(t)$ is available to the secondary user $SU_i$, 1 represents being available and 0 represents being unavailable. A transmission result value of the secondary user $SU_i$ at the time slot t is written as $\Gamma_i(t) \in [0 \ldots L_{SeV}]$, representing a position of the available transmission opportunity of the secondary user $SU_i$ in the transmission opportunity selection vector, if the value does not exceed $L_{SeV}-1$, it means the sequence number of the available transmission opportunity is $S_{i,\Gamma_i(t)}$, and if the value is $L_{SeV}$, it means there is no available transmission opportunity.

Figure 6:
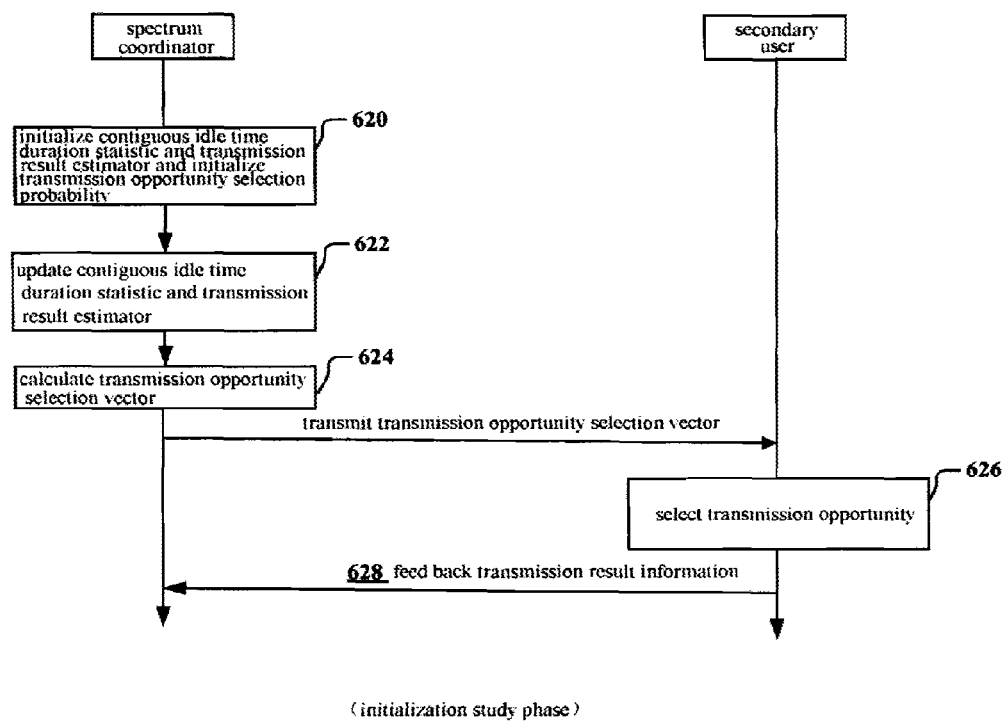
FIG. 6 is a schematic diagram illustrating an application example in which the resource allocation method according to the disclosure is applied to an initialization study procedure.
Figure 7:
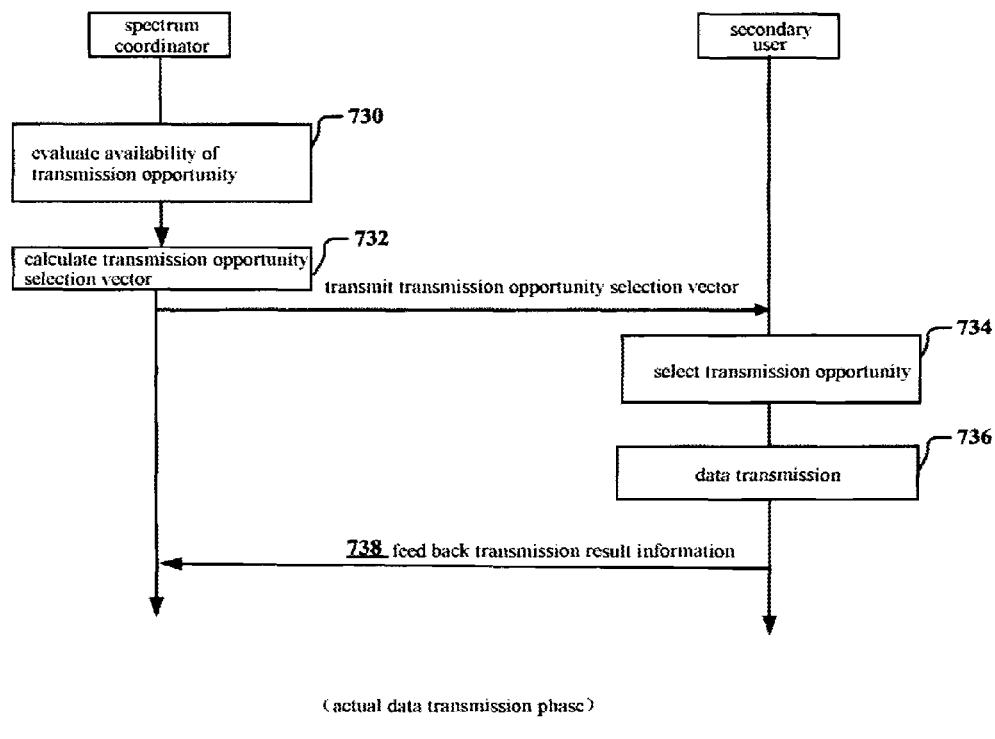
FIG. 7 is a schematic diagram illustrating an application example in which the resource allocation method according to disclosure is applied to an actual data transmission procedure.

An example in which the cognitive radio system applies the method according to the disclosure to an initialization study will be described with reference to FIG. 6 below. The initialization study phase may occur at the time of start or restart of the cognitive radio system.

A time variable is initialized as t=0. Further, assume that a time length of the initialization study phase is $T_T$, (in a unit of time slot) (as shown in FIG. 5).

First, in step 620, the contiguous idle time duration statistic and the transmission result estimator are initialized.

Each of the parameters of the contiguous idle time duration statistic of the channel $CH_j$ is initialized as zero, that is, $\overline{CITD}_j(t)=0$, $CITD_i(t)=0$, $\widetilde{CITD}_j(t)=0$ Each of the number of times $Z_{i,j}(0)$ that the secondary user $SU_i$ selects the channel $CH_j$, the number of times $Z_{i,j}(0)$ that the data transmission using the channel $CH_j$ is successful and the transmission result estimator $d_{i,j}(t)$ is initialized as zero, that is, $Z_{i,j}(0)=0$, $W_{i,j}(0)=0$, $d_{i,j}(t)=0$.

When the time slot t does not reach $T_L$ (that is, $0<t<T_L$), operations in following steps 622, 624, 626 and 628 are performed circularly at the time slot t.

Alternatively, in this step, the transmission opportunity selection probability may also be initialized. As one example, the transmission opportunity selection probability can be initialized by using a method described with reference to a formula (15) below.

Then, in step 622, the spectrum coordinator updates the contiguous idle time duration statistic and the transmission result estimator.

If it is the first time to enter the loop (that is, t=0), then this operation is ignored; otherwise (that is, t>0), after receiving the transmission result vector $R_i(t-1)$ from the secondary user, the spectrum coordinator judges utilization circumstance of the secondary user for each transmission opportunity and updates the contiguous idle time duration statistic and the transmission result estimator. A method for judgment is to satisfy the following two conditions in turn:

Condition 1: assume that all the transmission opportunities that have been labeled as available in all the transmission result vectors $R_i(t-1)$ ($0 \le i \le N_{SU}-1$) constitute a set written as:

$S_1 = \bigcup_{0 \le i \le N_{SU}-1} \{s_{i,j}(t-1) | r_{i,j}(t-1)=1;\}$

For any transmission opportunity $s \in S_1$ in $S_1$, if it has been labeled as available in the transmission result vectors of a plurality of secondary users, that is, $|\{i|s_{i,j}(t-1)=S \text{ and } r_{i,j}(t-1)=1, 0 \le i \le N_{SU}-1\}|>1$, then the secondary user for whom the position of the transmission opportunity in the transmission opportunity selection vector is in the foremost obtains the transmission opportunity, that is, $SU_{min\{i|s_{i,j}(t-1)=S \text{ and } r_{i,j}(t-1)=1, 0 \le i \le N_{SU}-1\}}$. For the transmission result vectors $R_i(t-1)$ of other secondary users $SU_i$, this transmission opportunity is labeled as unavailable.

Condition 2: after filtering through the condition 1, for any secondary user $SU_i$, if number of non-zero elements included in the transmission result vector $R_i(t-1)$ thereof exceeds one, that is, $|\{j|r_{i,j}(t-1)=1\}|>1$, it represents that there are a plurality of available transmission opportunities for this secondary user, and a transmission opportunity a position of which is in the foremost in the transmission opportunity selection vector is regarded as available to the secondary user, that is, $s_{i,min\{j|r_{i,j}(t-1)=1\}}(t-1)$ and other transmission opportunities in the transmission result vector $R_i(t-1)$ of the secondary user are labeled as unavailable. At this time, all the transmission opportunities that have been labeled as available in all the transmission result vectors $R_i(t-1)$ ($0 \le i \le N_{SU}-1$) form a set written as:

$S = \bigcup_{0 \le i \le N_{SU}-1} \{s_{i,j}(t-1) | r_{i,j}(t-1)=1\}$

That is to say, S is a set of transmission opportunities used by the secondary user. A set of transmission opportunities detected by the secondary base station that have neither been used by the primary system nor been used by the secondary user is written as $\bar{S}$. A set of other transmission opportunities used by the primary system is written as $\mathcal{S} = \{CH_j | 0 \le j \le N_{CH}-1\} - S - \bar{S}$ When updating the contiguous idle time duration statistic, if the channel $CH_j$ is used by the primary system at the time slot t-1 (that is, $CH_j \in \mathcal{S}$), all the parameter values are maintained to be constant when the channel is also used by the primary system at the time slot t-2 (that is, $CITD_i(t-1)=0$), that is, $\overline{CITD}_i(t) = \overline{CITD}_i(t-1)$, $CITD_i(t) = CITD_i(t-1)$, $\widetilde{CITD}_j(t) = \widetilde{CITD}_j(t-1)$: When the channel is not used by the primary system at the time slot t-2 (that is, $CITD_i(t-1)>0$), recalculation is performed to obtain:

$$\overline{CITD}_i(t) = \frac{\overline{CITD}_i(t-1) \times \widetilde{CITD}_j(t-1) + CITD_i'(t-1)}{\widetilde{CITD}_j(t-1) + 1}, \quad (5)$$

$$CITD_i'(t) > 0, \quad (6)$$

$$\widetilde{CITD}_j(t) = \widetilde{CITD}_j(t-1) + 1 \quad (7)$$

If the channel $CH_j$ is not used by the primary system (that is, $CH_j \in S \cup \bar{S}$), then:

$$\overline{CITD}_i(t) = \overline{CITD}_i(t-1), \quad (8)$$

$$CITD_i'(t) = CITD_i'(t-1)+1, \quad (9)$$

$$\widetilde{CITD}_j(t) = \widetilde{CITD}_j(t-1) \quad (10)$$

When updating the transmission result estimator, for any secondary user $SU_i$, the transmission result estimator of the unselected channel is maintained to be constant, that is, $d_{i,j}(t)=d_{i,j}(t-1)$; while for the selected channel $CH_j$ (in the transmission result vector $R_i(t-1)$ obtained after filtering using the condition 2), if a position that has been labeled as available exists, then $CH_j$ is a transmission opportunity for this position and all positions before this position in the transmission opportunity selection vector $S_i(t-1)$; otherwise, $CH_j$ is all transmission opportunities in the transmission opportunity selection vector $S_i(t-1)$, which can be represented by the following formula:

$$CH_j \in \begin{cases} \{s_{i,k}(t-1) | 0 \le k \le K, r_{i,K}(t-1)=1\}, \\ \quad \text{if } \exists r_{i,K}(t-1)=1, 0 \le K < L_{SeV} \\ \{s_{i,k}(t-1) | 0 \le k < L_{SeV}\}, \\ \quad \text{if } r_{i,K}(t-1)=1 \text{ does not hold}, 0 \le K < L_{SeV} \end{cases} \quad (11)$$

The following operations are performed: the number of selection times at the time slot t is increased by 1, that is, $Z_{i,j}(t)=Z_{i,j}(t-1)+1$; for a transmission opportunity $CH_j$ for which data transmission is successful (that is, in the transmission result vector $R_i(t-1)$ obtained after filtering using the condition 2), if a position that has been labeled as available exists, $CH_j$ is labeled as the transmission opportunity for this position in the selection vector $S_i(t-1)$; otherwise, $CH_j$ does not exist, which can be represented by the following formula:

$$CH_j \in \begin{cases} s_{i,K}(t-1), & \text{if } \exists\, r_{i,K}(t-1) = 1, 0 \leq K < L_{SeV} \\ \text{not exist}, & \text{if } r_{i,K}(t-1) = 1 \text{ does not hold}, 0 \leq K < L_{SeV} \end{cases} \quad (12)$$

The number of times is increased by 1, otherwise, the number of times remains the same, that is:

$$W_{i,j}(t) = \begin{cases} W_{i,j}(t-1) + 1, & \text{if } CH_j \text{ is an available} \\ & \text{transmission opportunity for } SU_i \\ W_{i,j}(t-1), & \text{others.} \end{cases} \quad (13)$$

Finally, the transmission result estimator is calculated using the above formula:

$$d_{i,j}(t) = \frac{w_{i,j}(t)}{z_{i,j}(t)} \quad (14)$$

In step 624, the spectrum coordinator performs calculation and transmission of the transmission opportunity selection vector.

In the initialization study phase ($T_L$), the secondary user obtains the use patter of the primary network resources only through study, and even if an available resource is found, it will not be used to perform actual data transmission. Therefore, the whole transmission opportunity is used for study as much as possible, and thus the length of the transmission opportunity selection vector may be set as an upper limit, that is, the whole time slot except for $T_E$ and $T_F$ is used to perform the transmission opportunity selection, which is represented as $$L_{SeV} = \min\left\{\left\lfloor \frac{T_{ts} - T_E - T_F}{T_{SeU}} \right\rfloor, N_{CH}\right\}.$$

A requirement for setting of the transmission opportunity selection matrix S(t) includes: ensuring that the value of each secondary user in each transmission opportunity selection unit is either the sequence number or −1 (indicating that there is no selectable transmission opportunity); ensuring that non-negative elements in the same column are different from each other so as to avoid mutual confliction when the secondary user performs the transmission opportunity selection; ensuring that non-negative elements in the same row are different from each other, that is, each non-negative elements occurs once at most in the selection vector of any secondary user so as to reduce duplicate selection; in the time of $T_L$, the number of selectable transmission opportunities for each secondary user is $T_L \times L_{SeV}$, ensuring that the number of times that any secondary user selects each channel exceeds a preset larger positive integer $N_{th}$, so that the secondary user learns enough information about the use pattern of each channel.

As one example of the method of calculating the transmission opportunity selection matrix S(t), a permutation of channel sequence numbers for each of secondary users is generated randomly as a start column of S(t), if the number of channel sequence numbers is smaller than the number of secondary users (that is, $N_{CH} < N_{SU}$), the value for the secondary user to whom a channel is not allocated is set as −1, and if the number of channel sequence numbers is larger than the number of secondary users (that is, $N_{CH} > N_{SU}$), first $N_{SU}$ channels are selected from $N_{CH}$ channels and then a permutation is generated randomly again. In order to ensure each secondary user has a similar selection opportunity on each channel, the newly generated permutation is compared with the former permutation, and if at least one bit is the same as the former one, a permutation is regenerated. In one time slot, the above operations are repeated to generate a matrix S(t) of $L_{SeV}$ columns; and in the time of $T_L$, the above operations are repeated to generate $T_L$ different matrixes S(t) so that an accumulated number of times that each channel occurs in the sequence of each secondary user exceeds $N_{th}$.

As another example of the method of calculating the transmission opportunity selection matrix S(t), a permutation of channel sequence numbers for each of secondary users is generated randomly as a start column of S(t), if the number of channel sequence numbers is smaller than the number of secondary users (that is, $N_{CH} < N_{SU}$), the value for the secondary user to whom a channel is not allocated is set as −1, and if the number of channel sequence numbers is larger than the number of secondary users (that is, $N_{CH} > N_{SU}$), $N_{SU}$ channels are selected therefrom randomly. A next column changes its selectable channel sequence number from the 0-th secondary user so that the value is different from that of each column in the row(s) before the row in which the 0-th secondary user is located in the matrix, and if not changeable, return to the former secondary user to make change, then a new permutation is generated among the subsequent secondary users. In one time slot, the above operations are repeated to generate a matrix S(t) of $L_{SeV}$ columns; and in the time of $T_L$, the above operations are repeated to generate $T_L$ different matrixes S(t) so that an accumulated number of times that each channel occurs in the sequence of each secondary user exceeds $N_{th}$.

After generating the transmission opportunity selection matrix S(t), each row thereof (that is, the transmission opportunity selection vector $S_i(t)$) is transmitted to a corresponding secondary user $SU_i$.

Assume that a set of transmission opportunities included in the transmission opportunity selection matrix S(t) is $S_0$, a set of all the transmission opportunities is $\{CH_j | j \in [0 \ldots N_{CH}-1]\}$, and a set of transmission opportunities not selected by the secondary user is $\mathbb{S}_0 = \{CH_j | j \in [0 \ldots N_{CH}-1]\} - S_0$. The set $S_0$ is transmitted to the secondary base station for detection (that is, this set includes transmission opportunities sensed and detected by the secondary base station). Of course, those skilled in the art should appreciate that when the set of transmission opportunities included in the transmission opportunity selection matrix S(t) equals to the set of all transmission opportunities, a set for sensing allocated to the secondary base station is a null set, that is, there is no need to perform any sensing operation.

In step 626, the secondary user selects the transmission opportunity according to the received transmission opportunity selection vector.

After the secondary user $SU_i$ having received the transmission opportunity selection vector $S_i(t)$, the transmission opportunity selection phase will be entered from a start time point of the 0-th transmission opportunity selection unit. In the initialization phase, the secondary user does not occupy the primary network resources to perform data transmission, and thus even if the secondary user discovers available resources, it can not ensure that this discovery is prior to other secondary users. Therefore, the secondary user $SU_i$ attempts on each transmission opportunity in the vector $S_i(t)$ in the transmission opportunity selection phase so as to generate the transmission result vector $R_i(t)$.

At the same time, the secondary base station senses the transmission opportunities in the set $\mathcal{S}_0$, detects a set of the transmission opportunities not used by the primary system which is written as $\mathcal{\tilde{S}}$, and feeds it back to the spectrum coordinator.

In step 628, the secondary user feeds back the transmission result information.

The secondary user $SU_i$ generates a transmission result vector $R_i(t)=[r_{i,0}(t) \ldots r_{i,L_{Sev}-1}(t)]$ at the time slot t, in which $r_{i,j}(t) \in \{0,1\}$ indicates whether the transmission opportunity $s_{i,j}(t)$ is available to $SU_i$, in which 1 indicates being available, and 0 indicates being unavailable. Then, the transmission result vector $R_i(t)$ is fed back to the spectrum coordinator.

As one example of initializing the transmission opportunity selection probability, for a second user $SU_i$, $i \in [0 \ldots N_{SU}-1]$, the transmission opportunity selection probability $p_{i,j}(T_L)$ is set as a average value, that is:

$$p_{i,j}(T_L) = \frac{1}{N_{CH}}, j \in [0 \ldots N_{CH}-1] \quad (15)$$

Specific examples of the initialization study phase have been described above. A specific example of an actual data transmission phase (a time period after $T_L$ as shown in FIG. 5) after the study phase will be described with reference to FIG. 7 below.

When t reaches $T_L$ and does not exceed a network overall operating time $T_D$ (that is, $T_L \le t \le T_D$), operations in steps 730-738 described below will be performed circularly at each time slot t.

In step 730, the spectrum coordinator evaluates the availability of the transmission opportunity.

In this step 730, the contiguous idle time duration statistic and the transmission result estimator may be updated at first.

If it is the first time to enter the loop (that is, $t=T_L$), then this operation is ignored; otherwise (that is, $t>T_L$), whether each transmission opportunity is available to the secondary user is judged according to the transmission result value $\Gamma_i(t-1)$, and the contiguous idle time duration statistic and the transmission result estimator are updated. If $\Gamma_i(t-1)<L_{Sev}$, then it indicates that the transmission opportunity with the sequence number $s_{i, \Gamma_i(t-1)}(t-1)$ is available to the secondary user $SU_i$, and thus a set of transmission opportunities that can be used by the secondary user may be represented as $S=\{s_{i, \Gamma_i(t-1)}(t-1)|\Gamma_i(t-1)<L_{Sev}\}$. A set of transmission opportunities detected by the secondary base station that have neither been used by the primary system nor been used the secondary user may be written as $\mathcal{\tilde{S}}$. A set of other transmission opportunities used by the primary system may be written as $\mathcal{S}=\{CH_j|0 \le j \le N_{CH}-1\}-S-\mathcal{\tilde{S}}$.

When updating the contiguous idle time duration statistic, if the channel $CH_j$ is used by the primary system at the time slot t-1 (that is, $CH_j \in \mathcal{S}$), all the parameter values are maintained to be constant when this channel is used by the primary system at the time slot t-2 (that is, $CITD_i(t-1)=0$), that is:

$$\overline{CITD}_i(t) = \overline{CITD}_i(t-1) \quad (16)$$

$$CI\acute{T}D_i(t) = CI\acute{T}D_j(t-1) \quad (17)$$

$$\widetilde{CITD}_j(t) = \widetilde{CITD}_j(t-1) \quad (18)$$

When the channel is not used by the primary system at the time slot t-2 (that is, $CITD_i(t-1)>0$), recalculation is performed, that is:

$$\overline{CITD}_i(t) = \frac{\overline{CITD}_i(t-1) \times \overline{CITD}_j(t-1) + CI\acute{T}D_i(t-1)}{\overline{CITD}_j(t-1)+1} \quad (19)$$

$$CI\acute{T}D_i(t) = 0 \quad (20)$$

$$\overline{CITD}_j(t) = \overline{CITD}_j(t-1) + 1 \quad (21)$$

If the channel $CH_j$ is not used by the primary system (that is, $CH_j \in S \cup \mathcal{\tilde{S}}$), then:

$$\overline{CITD}_i(t) = \overline{CITD}_i(t-1) \quad (22)$$

$$CI\acute{T}D_i(t) = CI\acute{T}D_i(t-1)+1 \quad (23)$$

$$\widetilde{CITD}_j(t) = \widetilde{CITD}_j(t-1) \quad (24)$$

When updating the transmission result estimator, any secondary user $SU_i$ maintains the transmission result estimator of the unselected channel to be constant, that is, $d_{i,j}(t)=d_{i,j}(t-1)$; while for the selected channel $CH_j$, if $\Gamma_i(t-1)<L_{Sev}$ (that is, the transmission opportunity is available), then $CH_j$ is a transmission opportunity for this position and all the positions before this position in the selection vector $S_i(t-1)$; otherwise, $CH_j$ is all the transmission opportunities in the selection vector $S_i(t-1)$, which can be represented as:

$$CH_j \in \begin{cases} \{s_{i,K}(t-1) | 0 \le k \le \Gamma_i(t-1)\}, & \text{if } \Gamma_i(t-1) < L_{Sev} \\ \{s_{i,k}(t-1) | 0 \le k < L_{Sev}\}, & \text{if } \Gamma_i(t-1) = L_{Sev} \end{cases} \quad (25)$$

The following operations may be performed: the number of selection times at the time slot t is increased by 1, that is, $z_{i,j}(t)=z_{i,j}(t-1)+1$; for a transmission opportunity $CH_j$ for which the data transmission can be performed successfully, if $\Gamma_i(t-1)<L_{Sev}$, then $CH_j$ is an available transmission opportunity; otherwise, $CH_j$ does not exist, which can be represented as:

$$CH_j = \begin{cases} s_{i,\Gamma_i(t-1)}(t-1), & \text{if } \Gamma_i(t-1) < L_{Sev} \\ \text{not exist}, & \text{if } \Gamma_i(t-1) = L_{Sev} \end{cases} \quad (26)$$

The number of times is increased by 1, otherwise, the number of times is maintained to be constant, that is:

$$W_{i,j}(t) = \begin{cases} W_{i,j}(t-1)+1, & \text{if } CH_j \text{ is a transmission} \\ & \text{opportunity available to } SU_i \\ W_{i,j}(t-1), & \text{others.} \end{cases} \quad (27)$$

Then, the transmission result estimator is calculated using the above formula (14) (that is, $$\left(\text{that is, } d_{i,j}(t) = \frac{w_{i,j}(t)}{z_{i,j}(t)}\right).$$

Then, in step 730, the transmission opportunity selection probability may also be updated.

If it is the first time to enter the loop (that is, $t=T_L$), this operation is ignored; otherwise (that is, $t>T_L$), the transmission opportunity selection probability is updated according to the transmission result estimator. For the transmission result estimator, a threshold $d_{th}$ is set. A transmission opportunity for which the transmission result estimator exceeds the threshold is rewarded, while a transmission opportunity for which the transmission result estimator does not exceed the threshold is punished. The transmission opportunity selection probability may be updated using the following method: assuming that a changing speed value is $\delta$, the number of the transmission opportunities being rewarded is $N_{re}$, and the number of the transmission opportunities being punished is $N_{CH}-N_{re}$, then for each rewarded transmission opportunity, the transmission opportunity selection probability $p_{i,j}(t)$ is assigned as:

$$p_{i,j}(t) = \min\left\{p_{i,j}(t-1) + \frac{\delta}{N_{re}}, 1\right\} \quad (28)$$

For each punished transmission opportunity, the transmission opportunity selection probability $p_{i,j}(t)$ is assigned as:

$$p_{i,j}(t) = \max\left\{p_{i,j}(t-1) + \frac{\delta}{N_{CH} - N_{re}}, 0\right\} \quad (29)$$

In step 732, the spectrum coordinator calculates and transmits the transmission opportunity selection vector.

In the actual data transmission phase, when the secondary user discovers an available resource, the actual data transmission is turned into. Therefore, the setting of the length of the transmission opportunity selection vector needs to consider a time length of active data transmission.

As one example, a method which is the same as that in the initialization transmission phase can be used, that is, the whole transmission opportunity is used for selection as much as possible, then the length of the transmission opportunity selection vector can be set as an upper limit, that is, the whole time slot except for $T_E$ and $T_F$ is used to perform transmission opportunity selection, which can be represented as $$L_{SeV} = \left\lfloor \frac{T_{ts} - T_E - T_F}{T_{SeU}} \right\rfloor.$$

However, in this method, even if a latter transmission opportunity selection unit finds a transmission opportunity, there is no sufficient time to perform data transmission, resulting in invalidity of the selection. Based on this, a time length of data transmission is defined as $T_{TR}$.

As another example, except for the time of $T_E$, $T_{TR}$ and $T_F$, the whole time slot is used to perform the transmission opportunity selection; meanwhile, in order to avoid duplicate selection for the same transmission opportunity in one selection sequence, the length of $L_{SeV}$ is set to not exceed the total number of the transmission opportunities $N_{CH}$, that is:

$$L_{SeV} = \min\left\{\left\lfloor \frac{T_{ts} - T_E - T_{TR} - T_F}{T_{SeU}} \right\rfloor, N_{CH}\right\} \quad (30)$$

The requirement for the transmission opportunity selection matrix S(t) is: ensuring that the value of each secondary user in each transmission opportunity selection unit is either the channel sequence number or −1 (indicating that there is no selectable transmission opportunity); ensuring that non-negative elements in the same column are different from each other so as to avoid mutual confliction when the secondary user performs the transmission opportunity selection; ensuring that non-negative elements in the same row are different from each other, that is, each non-negative element occurs once at most in the transmission opportunity selection vector of any secondary user so as to reduce duplicate selection.

Figure 8:
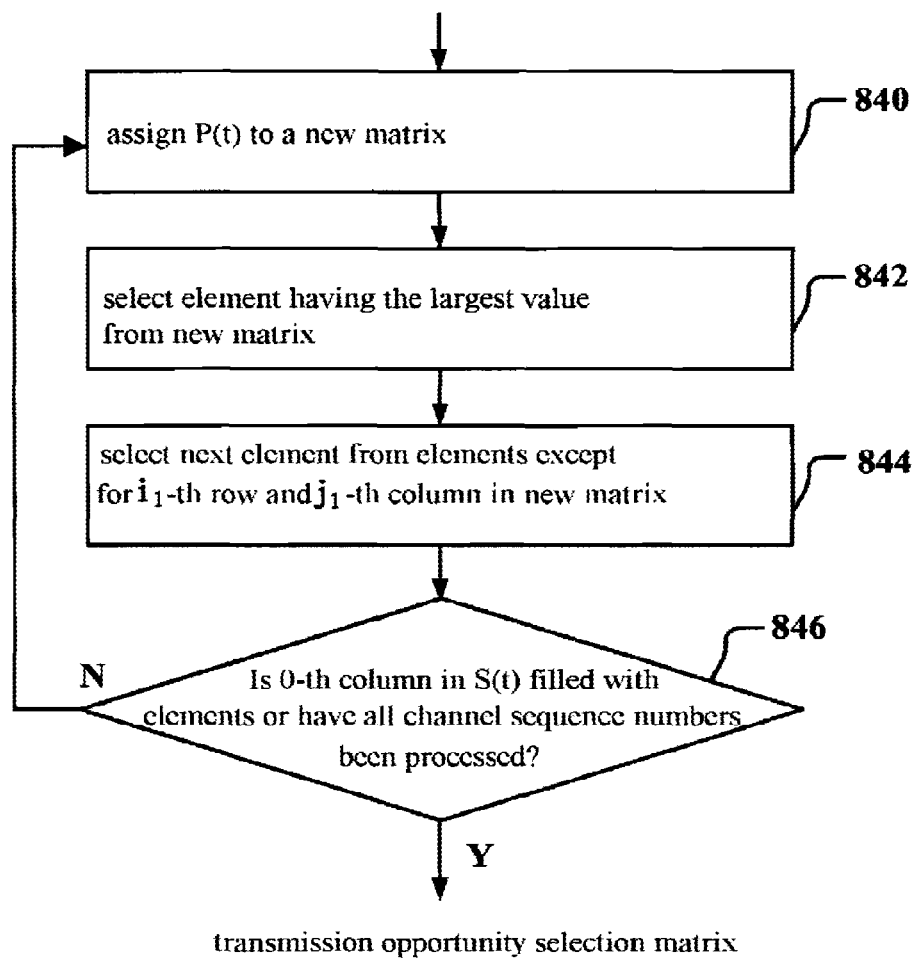
FIG. 8 is a schematic flow chart illustrating an example of calculating a transmission opportunity selection matrix.

FIG. 8 illustrates one example of calculating the transmission opportunity selection matrix S(t) according to the transmission opportunity selection probability matrix P(t) and the contiguous idle time duration statistic.

As shown in FIG. 8, in step 840, P(t) is assigned to a new matrix $\overline{P}(t)$.

In step 842, an element with a largest value is selected from the new matrix $\overline{P}(t)$, and if there are multiple elements with the same largest value at the same time, then a channel satisfying the following condition is selected therefrom:

$$\max\left\{\overline{CITD}_{j_1}(t) - CI\hat{T}D_{j_1}(t) \,\middle|\, 0 < \overline{CITD}_{j_1}(t) - CI\hat{T}D_{j_1}(t) < \left\lceil \frac{\overline{CITD}_{j_1}(t)}{2} \right\rceil\right\},$$

If there are still multiple elements, then one element is selected therefrom randomly. Assuming that the selected element is $\overline{p}_{i_1,j_1}(t)$, then its corresponding secondary user is $SU_{i_1}$, the channel is $CH_{j_1}$, the channel sequence number of the 0-th column in a row in which the secondary user $SU_{i_1}$ is located in the matrix S(t) is labeled as $CH_{j_1}$, that is, $s_{i_1,0}(t)=CH_{j_1}$, representing that $CH_{j_1}$ is the 0-th channel that the secondary user $SU_{i_1}$ selects to attempt, and the value of $\overline{p}_{i_1,j_1}(t)$ is set as 0.

In step 844, for elements except for the $i_1$-th row and the $j_1$-th column in the new matrix $\overline{P}(t)$, a next element $\overline{p}_{i_2,j_2}(t)$ is selected according to the method in step 842, and labeled as $s_{i_2,0}(t)=CH_{j_2}$. The value of $\overline{p}_{i_2,j_2}(t)$ is set as 0.

In step 846, it is judged that whether the 0-th column of S(t) is filled with the elements or whether all the channel sequence numbers have been processed. If not, operations in the above steps 840-844 are repeated until when the number of the channel sequence numbers is not smaller than the number of the secondary users, that is, $N_{CH} \geq N_{SU}$, the 0-th column of S(t) is filled with elements; or when the number of the channel sequence numbers is smaller than the number of the secondary users, that is $N_{CH} < N_{SU}$, all the channel sequence numbers have been processed. At this time, the 0-th column of the secondary user to whom a channel is not allocated in S(t) is set as −1.

After the steps 840-844, a new matrix $\overline{P}(t)$ may be formed. The steps 840-844 are repeated in the matrix, sequentially generating the first column, the second column until the $L_{SeV}-1$ column of S(t).

After generating the transmission opportunity selection matrix S(t), each row in the matrix (that is, the transmission opportunity selection vector $S_i(t)$) is transmitted to a corresponding secondary user $SU_i$.

In step 734, the secondary user selects the transmission opportunity according to the received transmission opportunity selection vector.

After receiving the transmission opportunity selection vector $S_i(t)$, the secondary user $SU_i$ enters the transmission opportunity selection phase at the start time point of the 0-th transmission opportunity selection unit. At the start time point of the 0-th transmission opportunity selection unit, the secondary user $SU_i$ senses a transmission opportunity corresponding to the 0-th element $s_{i,0}(t)$ in the selection vector. If the detection result indicates this transmission opportunity is available, the secondary user immediately turns into the data transmission phase, and if the detection result indicates this transmission opportunity is unavailable, the secondary user senses a next transmission opportunity in the selection vector at the start of a next transmission opportunity selection unit. Repeat this until a certain transmission opportunity is found to turn into the data transmission phase, or until no available resource has been found after attempting on all the transmission opportunities in the transmission opportunity selection vector, then the attempt is given up.

In step 736, the secondary user utilizes the selected transmission opportunity to perform data transmission.

After the secondary user $SU_i$ finds the available resource in the transmission opportunity selection phase, the data transmission phase is turned into immediately to utilize the resource.

In step 738, the secondary user feeds back information about the transmission result.

The secondary user $SU_i$ generates a transmission result value of the time slot t. If the value does not exceed $L_{SeV}-1$, it indicates that the sequence number of the available transmission opportunity is $S_{i,\ \Gamma_i(t)}(t)$; if the value is $L_{SeV}$, it indicates that there is no available transmission opportunity. The secondary user $SU_i$ may utilize a predetermined feedback channel to feed back the transmission result value to the secondary base station serving the secondary user $SU_i$, and the information is sent to the decision-making spectrum coordinator by the secondary base station.

Some of the embodiments and examples of the resource allocation method and the resource utilization method according to the disclosure have been described above. A resource allocation apparatus and a resource utilization apparatus according to embodiments of the disclosure will be described with reference to FIGS. 9-10 below.

Figure 9:
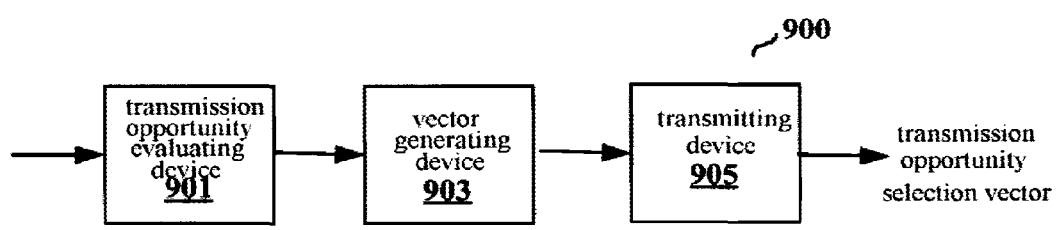
FIG. 9 is a schematic block diagram illustrating a resource allocation apparatus in a cognitive radio system according to an embodiment of the disclosure.

FIG. 9 is a schematic block diagram illustrating a structure of a resource allocation apparatus according to an embodiment of the disclosure. A resource allocation apparatus 900 can be configured on the secondary base station side of the secondary network or configured on the spectrum coordinator side, for example, as part of the secondary base station or the spectrum coordinator.

As shown in FIG. 9, the resource allocation apparatus 900 includes a transmission opportunity evaluating device 901, a vector generating device 903 and a transmitting device 905.

The transmission opportunity evaluating device 901 is used to evaluate the availability of transmission opportunities in wireless resources of the primary communication system.

Similar to the method embodiments and examples described above, the availability of a transmission opportunity referred herein is a feature value representing whether the transmission opportunity is available to the secondary user. It may be used to characterize use patterns for the licensed spectrum by the primary network and the secondary network. For example, the availability of the transmission opportunity may be represented by one or more of the contiguous idle time duration statistic, the transmission result estimator and the transmission opportunity selection probability. The contiguous idle time duration statistic indicates a contiguous time length that a frequency band corresponding to the transmission opportunity is not used by the primary network, the transmission result estimator indicates a statistical result that the secondary user succeeds in data transmission on a frequency band corresponding to each transmission opportunity, and the transmission opportunity selection probability indicates a probability that the secondary user selects the transmission opportunity.

As one example, the transmission opportunity evaluating device 901 may calculate the contiguous idle time duration statistic of a transmission opportunity as the feature value reflecting the availability of the transmission opportunity. The contiguous idle time duration statistic of the transmission opportunity may be represented by one or more of the following parameters: (1) an average time length of contiguous idle time durations of a frequency band in which the transmission opportunity in located within a past predetermined time period; (2) a time length of a contiguous idle time duration having a maximum occurrence probability of a frequency band in which the transmission opportunity is located within a past predetermined time period; (3) a time length of a contiguous idle time duration in which a corresponding time point is located of a frequency band in which a current transmission opportunity is located within a past predetermined time period (if the current transmission opportunity is used by the primary network, the value is zero). These time statistic may be sensed by the spectrum coordinator or the secondary base station, or may be sensed by each secondary user and reported to the secondary base station or the spectrum coordinator to perform statistics; and (4) number of accumulated contiguous idle time durations of a frequency band in which the transmission opportunity is located within a past predetermined time period.

As one example, the transmission opportunity evaluating device 901 may further calculate the transmission result estimator of a transmission opportunity as the feature value reflecting the availability of the transmission opportunity. The transmission result estimator may be defined as number of times that the secondary user successfully performs data transmission on a frequency band corresponding to each transmission opportunity within a predetermined time period before a time point corresponding to a current transmission opportunity. As a modification, the transmission opportunity evaluating device 901 may normalize the transmission result estimator as a ratio of the number of times that the secondary user successfully performs data transmission on the frequency band corresponding to each transmission opportunity to a total number of times that the secondary user attempts to perform data transmission within a predetermined time period prior to the time point corresponding to the current transmission opportunity. The information regarding whether the data transmission on the transmission opportunity by the secondary user is successful is fed back to the secondary base station or the spectrum coordinator from the secondary user and is statistically calculated by the secondary base station or the spectrum coordinator.

As one example, the transmission opportunity evaluating device 901 may further calculate the transmission opportunity selection probability according to the above transmission result estimator. The transmission opportunity selection probability varies with the variation in the transmission opportunity estimator. Specifically, the transmission opportunity selection probability increases as the transmission result estimator increases and decreases as the transmission result estimator decreases. The transmission opportunity selection probability may be calculated using the method described with reference to the formula (15), (28) or (29) or FIG. 3 below for example, and no detailed description will be made herein.

The vector generating device 903 is used to set a transmission opportunity selection vector for each secondary user in the cognitive radio system according to the availability of each transmission opportunity, the transmission opportunity selection vector of each secondary user including information for identifying a plurality of transmission opportunities that have been evaluated as available. The vector generating device 903 may use the method described in each of the embodiments and examples above to generate the transmission opportunity selection vector, and no repeated description will be made herein.

When setting the transmission opportunity selection vector for each secondary user, the vector generating device 903 needs to ensure that the sequence numbers of the transmission opportunities at the same position of the transmission opportunity selection vectors of respective secondary users are different. As such, it is possible to avoid collision among the secondary users at the time of transmission opportunity selection (that is, different secondary users occupy the same transmission opportunity at the same time). Further, for example, when setting the transmission opportunity selection vector for each secondary user, the vector generating device 903 needs to ensure that the sequence numbers of the transmission opportunities at different positions of the transmission opportunity selection vector of a same secondary user are different. As such, it is possible to avoid the secondary user from repeatedly selecting the same transmission opportunity for many times at the transmission opportunity selection phase in one transmission opportunity.

After the vector generating device 903 obtaining the transmission opportunity selection vector for the secondary user through calculation, the transmitting device 905 transmits the generated transmission opportunity selection vector to the corresponding secondary user.

In the above embodiments and examples, a transmission opportunity selection vector is set for each secondary user, that is, a rule for selecting the transmission opportunity by the secondary user is set, and since a plurality of transmission opportunities provided to a secondary user are selected according to the availability of the transmission opportunities with respect to the secondary user, the efficiency for selecting the transmission resource by the secondary user is improved and the resource utilization rate is improved.

Further, as an example, the transmission opportunity selection vector may include only the sequence numbers of the transmission opportunities that have been evaluated as available with respect to the secondary user, and thus the transmission of the transmission opportunity selection vector only occupies less transmission resources and incurs less delay of time.

As one example, the information for identifying the plurality of transmission opportunities that have been evaluated as available in the transmission opportunity selection vector may be arranged in an order based on availability values of the plurality of transmission opportunities that have been evaluated as available. In this way, the secondary user preferably selects a transmission opportunity with a larger availability value according to a rank of each transmission opportunity that has been evaluated as available in the vector, thereby further reducing the time taken for selection, and the resource selection efficiency may be further improved.

As another example, transmission opportunities that have been evaluated as available at the same corresponding positions of transmission opportunities selection vectors selected for different secondary users are different from each other, and thus it is possible to avoid transmission collision among respective secondary users.

As a specific example, the above resource allocation apparatus 900 may save the information regarding the availability of the transmission opportunity of each secondary user (for example, in a storage device (not shown in the drawing)), and may calculate and update the information regarding the availability of the transmission opportunity of each secondary user according to the transmission result fed back by the secondary user and a detection result of the transmission opportunity not selected by the secondary user from the secondary base station during the resource allocation.

Figure 10:
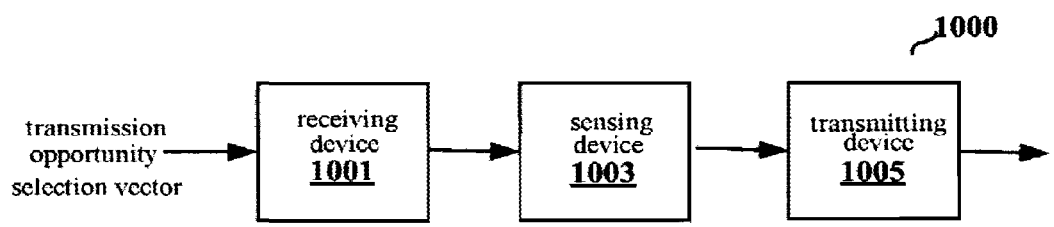
FIG. 10 is a schematic block diagram illustrating a resource utilization apparatus in a cognitive radio system according to an embodiment of the disclosure.

FIG. 10 is a schematic block diagram illustrating a resource utilization apparatus in the cognitive radio system according to an embodiment of the disclosure. A resource utilization apparatus 1000 is provided on the secondary user side, and may be configured as part of the secondary user equipment for example.

As shown in FIG. 10, the resource utilization apparatus 1000 includes a receiving device 1001 and a sensing device 1003.

The receiving device 1001 is used to receive a transmission opportunity selection vector for a secondary user from the spectrum coordinator or the secondary base station. As described above, the transmission opportunity selection vector includes information for identifying a plurality of transmission opportunities that have been evaluated as available.

As one example, the transmission opportunity selection vector may be a permutation of the sequence numbers of the plurality of transmission opportunities that have been evaluated as available, such as the permutation in an order based on the availability values of respective transmission opportunities that have been evaluated as available. The embodiments or examples described above have provided detailed description and specific examples of the transmission opportunity selection vector, and no repeated description will be made herein.

Then, the sensing device 1003 selects a transmission opportunity from the plurality of transmission opportunities that have been evaluated as available included in the transmission opportunity selection vector and senses the selected transmission opportunity that has been evaluated as available, so as to determine whether the transmission opportunity is available currently (that is, sense whether the transmission opportunity is used by the primary network currently). If yes (that is, if it is sensed that the transmission opportunity is idle currently), then the secondary user utilizes the transmission opportunity to perform data transmission. Otherwise, the sensing device 1003 senses a next transmission opportunity that has been evaluated as available in the transmission opportunity selection vector. If it is sensed that all the transmission opportunities that have been evaluated as available in the transmission opportunity selection vector are unavailable currently, the secondary user does not perform data transmission this time.

In one specific example, the information for identifying the plurality of transmission opportunities that have been evaluated as available in the transmission opportunity selection vector may be arranged in an order based on availability values of the plurality of transmission opportunities that have been evaluated as available. Thus, the sensing device 1003 may first sense a transmission opportunity corresponding to a largest availability value among the plurality of transmission opportunities that have been evaluated as available in the transmission opportunity selection vector. If it is sensed that the transmission opportunity is available, the secondary user utilizes this available transmission opportunity to perform data transmission. Otherwise, the sensing device 1003 sequentially senses a next transmission opportunity that has been evaluated as available in the transmission opportunity selection vector.

As one example, the resource utilization apparatus 1000 may further include a transmitting device 1005. The transmitting device 1005 feeds back transmission result information regarding data transmission by using the transmission opportunity.

As a specific example, the fed back transmission result information may include a transmission result vector and/or a transmission result value. The transmission result vector includes information indicating whether each of the transmission opportunities in the transmission opportunity selection vector is available to the secondary user and/or whether data transmission is successful. The transmission result value indicates a position of the transmission opportunity used by each secondary user in the transmission opportunity selection vector, if the value is smaller that the length of transmission opportunity selection vector, the selected transmission opportunity can be determined by inquiring the transmission opportunity selection vector, and if the value is not smaller than the length of the transmission opportunity selection vector, it can be determined that the secondary user finds no available transmission opportunity.

As a specific example, the time point for the transmitting device 1005 to feed back information can be determined according to the feedback channel. For example, the transmitting device 1005 may utilize a dedicated feedback channel to perform feedback immediately after the secondary user determines the transmission opportunity. Further, for example, for a secondary user having obtained an available transmission opportunity, the transmitting device 1005 may utilize the obtained resource to perform feedback after the data transmission, while a secondary user having not obtained an available transmission opportunity uses some dedicated feedback channels to perform feedback after completing the transmission opportunity selection.

According to one embodiment of the disclosure, there is further provided a cognitive radio system including the resource allocation apparatus and the resource utilization apparatus described above. The resource allocation apparatus may be provided at the secondary base station or the spectrum coordinator, and may be provided as part of the secondary base station or the spectrum coordinator. The resource utilization apparatus may be provided at the secondary user, and may be provided as part of the secondary user equipment.

It is to be noted that the above embodiments and examples are exemplary but not exhaustive, and the disclosure should not be regarded as being limited to any specific embodiments or examples. Further, in the above embodiments and examples, reference signs are used to represent steps of the method or modules of the apparatus. Those skilled in the art should appreciate that these reference signs are only to literally distinguish these steps or modules but not to represent an order thereof or any other limitation.

As one example, each step of the above method and each constituting module and/or device of the above apparatus may be implemented as software, firmware, hardware or combinations thereof. Each constituting component, unit and sub unit in the above device may be configured in a form of software, hardware or combinations thereof. Specific means or manners that may be used for configuration are well known to those skilled in the art, and no detailed description will be made herein.

The present disclosure further proposes a program product storing machine-readable instruction codes. When being read and executed by the machine, the instruction codes may perform the above resource allocation method and resource utilization method according to the embodiments of the disclosure.

Accordingly, a storage medium carrying the above program product storing the machine-readable instruction codes is also included in the present disclosure. The storage medium includes but not limited to a floppy disk, an optical disk, a magneto-optical disk, a storage card, a memory stick and so on.

In the above description for the specific embodiments of the disclosure, features described and/or illustrated for one embodiment may be used in one or more other embodiments in the same or similar way, be combined with features in other embodiments, or replace features in other embodiments.

It is to be emphasized that the term "include/comprise" used herein indicates presence of features, elements, steps or assemblies, but does not exclude presence or addition of one or more other features, elements, steps or assemblies.

Further, the method of the disclosure is not limited to be performed chronically in a time sequence described in the specification, and may also be performed chronically in other time sequences, in parallel or independently. Therefore, the executing order of the method described in the specification makes no limitation on the technical scope of the disclosure.

Although the present disclosure has been disclosed through the description for the specific embodiments of the disclosure above, it should be appreciated that those skilled in the art may devise various modifications, improvements or equivalents to the disclosure within the spirit and scope of the appended claims. These modifications, improvements or equivalents should also be deemed as being included in the protection scope of the disclosure.

The invention claimed is:

1. An electronic device in a wireless communication system, comprising:
   processing circuitry configured to:
   evaluate an availability of transmission opportunities in wireless resources;
   identify a plurality of available transmission opportunities according to a result of the evaluation;
   rank the plurality of available transmission opportunities for at least one user terminal; and
   transmit rankings of the plurality of available transmission opportunities to the at least one user terminal, so the at least one user terminal can select from the plurality of selection opportunities.

2. The electronic device of claim 1, wherein the processing circuitry is configured to rank the plurality of available transmission opportunities to identify a transmission priority of each of the plurality of available transmission opportunities for the at least one user terminal so that the higher the transmission priority is, the higher a rank of an available transmission opportunity corresponding to the transmission priority is, and the more likely the at least one user terminal selects the corresponding available transmission opportunity for transmission.

3. The electronic device of claim 2, wherein the processing circuitry is configured to rank the plurality of available transmission opportunities in a form of a transmission opportunities selection vector by arranging the plurality of available transmission opportunities in an order based on values of the plurality of available transmission opportunities.

4. The electronic device of claim 3, wherein
the processing circuitry is configured to set a transmission opportunities selection vectors set for a plurality of user terminals,
the transmission opportunities selection vectors set comprises a plurality of transmission opportunities selection vectors,
each of the transmission opportunities selection vector is for each user terminal, and
the plurality of available transmission opportunities at the same corresponding positions of the plurality of transmission opportunities selection vectors set for different user terminals are different from each other.

5. The electronic device of claim 1, wherein the processing circuitry is further configured to rank the plurality of available transmission opportunities for a plurality of user terminals, and
transmission priorities of each of the plurality of available transmission opportunities for different user terminals are different.

6. The electronic device of claim 1, wherein the processing circuitry is further configured to acquire usage information of the wireless resources to evaluate availability of the transmission opportunities.

7. The electronic device of claim 1, wherein availability time of the wireless resources is acquired to evaluate availability of the transmission opportunities, and the availability time by calculating contiguous idle time duration statistic of a frequency band in which the transmission opportunity is located within a past predetermined time period, and
the contiguous idle time duration statistic comprises one or more of the following parameters:
an average time length of contiguous idle time durations of the frequency band in which the transmission opportunity is located within the time period;
a time length of a contiguous idle time duration which occurs most frequently of the frequency band in which the transmission opportunity is located within the time period;
a time length of a contiguous idle time duration in which a corresponding time point is located of the frequency band in which the transmission opportunity is located within the time period; and
number of accumulated contiguous idle time durations of the frequency band in which the transmission opportunity is located within the time period.

8. The electronic device of claim 1, wherein
the processing circuitry is further configured to evaluate, for each user terminal, availability of a transmission opportunity to be evaluated by calculating a transmission result estimator of the user terminal on a frequency band corresponding to the transmission opportunity, and
the processing circuitry is configured to calculate number of times of data transmission successes of the user terminal on the frequency band corresponding to the transmission opportunity within a predetermined time period prior to current time point or a ratio of the number of times of the data transmission successes to a total number of times that a secondary user terminal attempts to perform data transmission on the frequency band corresponding to the transmission opportunity, as the transmission result estimator of the transmission opportunity.

9. The electronic device of claim 1, wherein each of the plurality of available transmission opportunities comprises a plurality of ranks.

10. An electronic device in a wireless communication system, comprising:
processing circuitry configured to:
obtain rank information of a plurality of available transmission opportunities for wireless transmission by the electronic device, the rank information comprising wireless transmission priorities of the plurality of available transmission opportunities for the electronic device; and
sense at least one of the plurality of available transmission opportunities based on the rank information, to judge whether the at least one of the plurality of available transmission opportunities is currently available, and to determine that the at least one of the plurality of available transmission opportunities is available for wireless transmission if the sensed available transmission opportunity is currently available.

11. The electronic device of claim 10, wherein
the processing circuitry is further configured to:
sense a transmission opportunity that has been evaluated as available corresponding to a largest availability value among the plurality of transmission opportunities that have been evaluated as available in a transmission opportunity selection vector to judge whether the transmission opportunity that has been evaluated as available corresponding to the largest availability value is currently available, and if yes, to determine that the transmission opportunity that has been evaluated as available corresponding to the largest availability value is currently available for wireless transmission, otherwise, to sequentially sense a next transmission opportunity that has been evaluated as available in the transmission opportunity selection vector, until a currently available transmission opportunity is found or until there is no selectable transmission opportunity that has been evaluated as available in the transmission opportunity selection vector.

12. The electronic device of claim 10, further comprising:
a transmitting device configured to feedback transmission result information regarding wireless transmission by using the transmission opportunity.

13. The electronic device of claim 12, wherein the transmission result information comprises a transmission result vector and/or a transmission result value, the transmission result vector comprises information indicating whether each of transmission opportunities in the transmission opportunity selection vector is available for a user terminal and/or whether wireless transmission is successful, and the transmission result value indicates a position of the transmission opportunity used by the user in the transmission opportunity selection vector.

14. The electronic device of claim 10, wherein the each of the plurality of available transmission opportunities comprises a plurality of priorities.

15. A wireless communication method comprising:
evaluating, an availability of transmission opportunities in wireless resources;
identifying a plurality of available transmission opportunities according to a result of the evaluation;
ranking the plurality of available transmission opportunities; and
transmitting a result of the ranking to at least one user terminal, and said transmitting including transmitting rankings of the plurality of available transmission opportunities to the at least one user terminal, so the at least one user terminal can select from the plurality of selection opportunities.

16. A wireless communication method comprising:
obtaining rank information of a plurality available transmission opportunities for wireless transmission of an electronic device in a wireless communication system, the rank information comprising wireless transmission priorities of the plurality of available transmission opportunities for the electronic device;
selecting one or more of the plurality available transmission opportunities based on rank information; and
sensing the selected one or more of the plurality available transmission opportunities to judge whether the selected one or more of the plurality available transmission opportunities is currently available, and to determine that the selected one or more of the plurality available transmission opportunities is available for wireless transmission if the selected one or more of the plurality available transmission opportunities is currently available.

17. The wireless communication method of claim 16, further comprising:
sensing a transmission opportunity that has been evaluated as available corresponding to a largest availability value among the plurality of transmission opportunities that have been evaluated as available based on the rank information to judge whether the transmission opportunity that has been evaluated as available corresponding to the largest availability value is currently available, and if yes, selecting the transmission opportunity that has been evaluated as available corresponding to the largest availability value for data transmission, otherwise, sequentially sensing a next transmission opportunity that has been evaluated as available in a transmission opportunity selection vector, until an available transmission opportunity is found or until there is no selectable transmission opportunity that has been evaluated as available in the transmission opportunity selection vector.

18. The wireless communication method of claim 16, further comprising:
feeding back transmission result information regarding data transmission by using the transmission opportunity.

19. The wireless communication method of claim 18, wherein
the transmission result information comprises a transmission result vector and/or a transmission result value,
the transmission result vector comprises information indicating whether the transmission opportunities in the transmission opportunity selection vector are available for the user and/or whether data transmission is successful, and
the transmission result value indicates a position of the transmission opportunity used by the user in the transmission opportunity selection vector.

* * * * *